Jan. 7, 1964  A. C. SCINTA  3,116,507
WINDSHIELD WIPER SYSTEM
Filed May 2, 1960
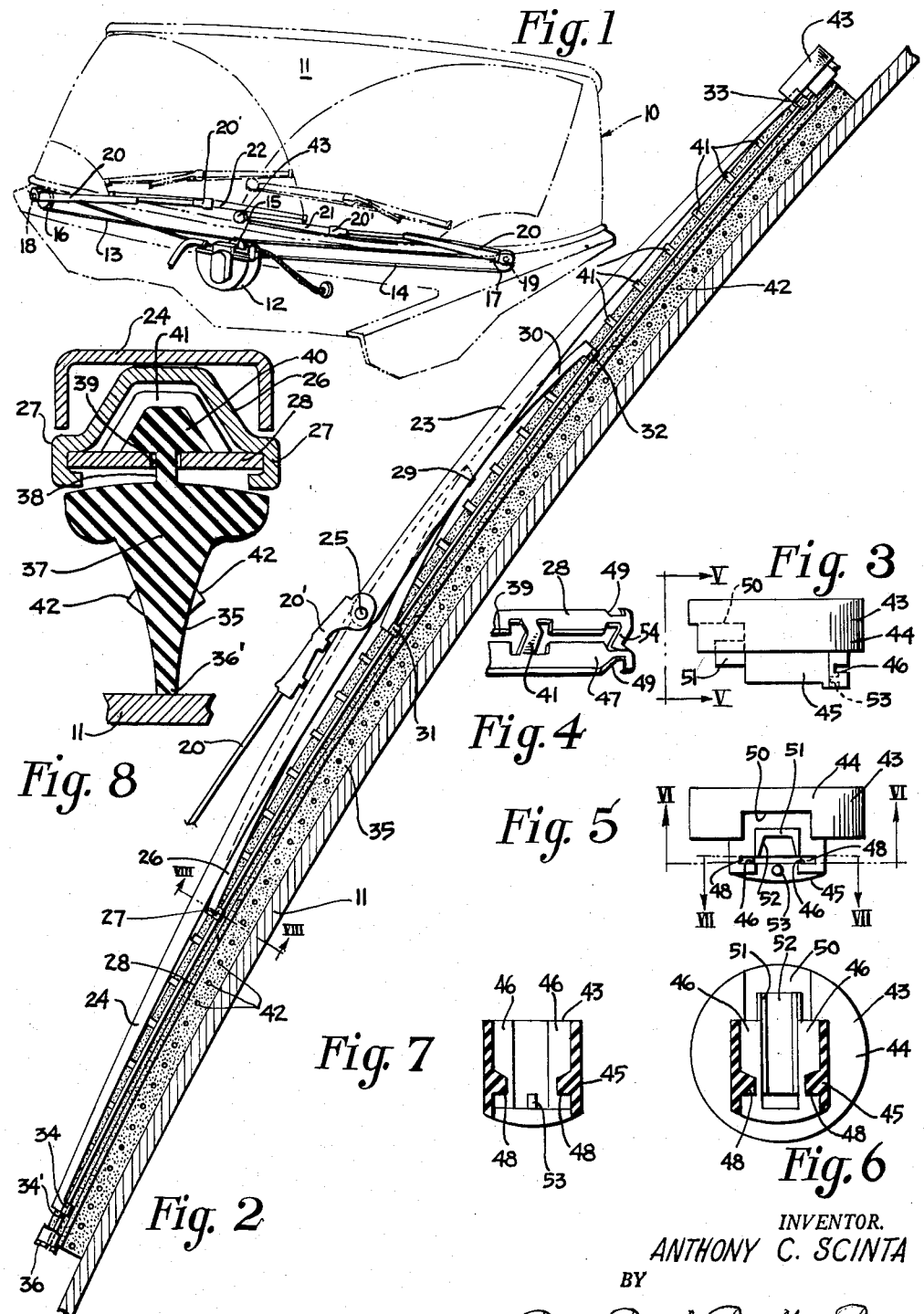
INVENTOR.
ANTHONY C. SCINTA
BY
Bean Brooks Buckley & Bean
ATTORNEYS

United States Patent Office 3,116,507
Patented Jan. 7, 1964

3,116,507
WINDSHIELD WIPER SYSTEM
Anthony C. Scinta, Hamburg, N.Y., assignor to
Trico Products Corporation, Buffalo, N.Y.
Filed May 2, 1960, Ser. No. 25,947
5 Claims. (Cl. 15—250.42)

The present invention relates to an improved windshield wiper for use in a system wherein wipers traveling in opposed relationship produce overlapping wipe patterns and wherein the wipers are parked with their ends in overlapping relationship at their inboard ends of travel.

In certain wiper installations it is desirable that the wipers provide overlapping wipe patterns during their inboard travel in order to clear a relatively large portion of the windshield. In installations of this type, the wipers are usually parked at their extreme inboard limit of movement. However, it has been necessary in the past to space the wipers sufficiently far from each other when they are parked so that when the wiper system is started up the ends of the wipers do not catch on each other. This spacing is undesirable because it causes one wiper to remain in an undesirably high position on the windshield when the wiper system is not being used. Furthermore, while installations utilizing an opposed overlapping type of wiping arrangement are originally installed to avoid interference or contact between the blades, it sometimes happens that the wipers may eventually become misaligned with the attendant result that they may sometimes strike each other during operation and may thus be damaged. It is with overcoming the foregoing shortcomings of the prior art that the present invention is concerned.

It is accordingly one object of the present invention to provide a wiper system wherein the wipers, which travel in opposed relationship and provide overlapping wipe patterns, are so constructed that it is impossible for them to catch on each other during operation.

It is another object of the present invention to provide an improved opposed overlapping type of wiper system wherein the wipers can be parked in overlapping relationship extremely close to the lower portion of the windshield without danger of catching each other.

A further object of the present invention is to provide an improved wiper adapted to be installed in an opposed overlapping type of wiper installation, the improved wiper tending to obviate the possibility of the wipers catching on each other either during parking or during operation.

Yet another object of the present invention is to provide a simplified attachment for a wiper which prevents it from catching onto another wiper with which it is associated in opposed overlapping relationship on the windshield. Other objects and attendant advantages of the present invention will readily be perceived hereafter.

In accordance with the present invention, the wiper system includes a wiper having a fender or guard of generally disc-like configuration mounted on the outer end thereof, and this wiper is adapted to park abutting the lower molding of the windshield. The end portion of the other wiper rests on the fender when the blades are parked, but does not contact the fender when the wipers are oscillated during actual operation, except if the wipers are not in proper alignment. Thus the fender insures a certain minimum spacing between the wipers to thereby prevent the blades, one of which travels slightly in advance of the other, from becoming entangled with each other when the wipers are being moved to or from a parking position, or when the wipers are oscillating in the zone where their wipe patterns overlap. Because this mode of positive spacing is utilized, freedom from entanglement of the wiper ends is assured without the necessity of resorting to exaggerated spacing between the wipers, which would result in one blade being located undesirably high on the windshield during parking. The fender or guard is constructed so that it can be easily mounted on a wiper to provide the above described results. Furthermore, the fender or guard possesses a mounting construction which causes it to fit securely on the outer end of the wiper to thereby prevent its disengagement therefrom either in operation or as a result of careless handling. The present invention will be more fully understood when the following portions of the specification are read in conjunction with the accompanying drawings wherein:

FIG. 1 is a fragmentary perspective view of an automotive vehicle having the improved wiper of the present invention;

FIG. 2 is an enlarged side elevational view of a wiper shown in FIG. 1;

FIG. 3 is an enlarged side elevational view of the rubber-like plastic fender or guard;

FIG. 4 is an enlarged view of the end of the flexible backing strip of the wiper which is adapted to mount the fender or guard;

FIG. 5 is a view taken along line V—V of FIG. 3;

FIG. 6 is a view taken along line VI—VI of FIG 5;

FIG. 7 is a view taken along line VII—VII of FIG. 5; and

FIG. 8 is a view taken along line VIII—VIII of FIG. 2.

In FIG. 1 an automotive vehicle 10 is shown having a curved windshield 11 mounted thereon in the usual manner. Suitably mounted underneath the cowl of the vehicle is a windshield wiper motor 12 which is adapted to be actuated from a suitable source of energy such as the engine intake manifold. Flexible cables 13 and 14 extend between a pulley 15 which is oscillated by wiper motor 12 and pulleys 16 and 17 mounted on drive shafts 18 and 19, respectively, which are suitably journaled in the cowl of the vehicle and mount wiper arms 20 which in turn mount wipers 21 and 22 by means of clips 20'.

The wiper 21 includes a superstructure consisting of channel shaped levers 23 and 24 which are movably pinned to each other by rivet 25, which also pivotably supports clip 20'. A spring (not shown) encircles rivet 25 and biases levers 23 and 24 in a clockwise and counter-clockwise direction, respectively, when viewed from FIG. 2. A yoke-like lever 26 of channel shaped cross-section is also pivotably mounted on rivet 25. The lower end of lever 26 is formed into fingers 27 which slidably engage opposite edge portions of flexible backing strip 28. The upper portion of lever 26 is formed into similar fingers 29 which rockably engage opposite sides of the central portion of channel shaped yoke 30. Yoke 30 in turn has its ends 31 and 32 formed into fingers which are similar to fingers 27. The ends 33 and 34 of levers 23 and 24, respectively, are also formed into finger-like members such as 27 (FIG. 8). Thus four sets of fingers are provided at 27, 31, 32, and 33 for slidably engaging opposite edge portions of flexible backing strip 28 for transmitting pressure from wiper arm 20 to rubber blade 35 carried by the backing strip. However, the fingers located at 34 engage a notch 34' in the backing strip for anchoring the blade and backing strip assembly in the superstructure. Furthermore, plastic cap 36 is mounted on the lower end of flexible backing strip 28. The assembly of levers 23, 24, 26, and 30 may be considered the conforming mechanism for causing the blade to conform to various parts of a curved windshield, as is well known.

Blade 35 includes a wiping lip 36' which extends downwardly from central portion 37. A reduced neck portion 38 is adapted to fit within slot 39 of the flexible backing strip 28. An enlarged top portion 40 of the blade 35 is located above slot 39. A plurality of ribs 41 are formed at spaced intervals along the top of the backing strip for the purpose of lending rigidity to the backing strip against lateral distortion. Raised protuberances 42 are provided at spaced intervals along each side of the central portion 37 of the blade 35 in a manner which is known in the art.

As can be seen from FIG. 1, in order for the wipers to clear a relatively large portion of the windshield, the wipe patterns overlap at the inboard ends of wiper travel. A fender or guard 43 is adapted to be mounted on outer end of lever 23 of the wiper to prevent entangling contact between the outer ends of the wipers in their inboard areas of travel. In this respect it can readily be seen that guard 43 prevents the outer claws 33 of the wipers from catching on each other. Furthermore because guard 43 is mounted on the outer end of wiper 21, wiper 22 can be caused to abut guard 43 when the wipers are parked, this obviating the necessity for providing relatively large spacing between the wipers in their parked position, as would be required if guard 43 were not used.

Fender or guard 43 consists of a disc-like upper portion 44 which holds wiper 22 spaced from wiper 21. Integrally formed with disc 44 is a lower depending portion or anchoring member 45 which has slots 46 therein. The anchoring end 47 (FIG. 4) of flexible backing strip 28 is adapted to be inserted into slots 46 by a sliding motion. Slots 46 have projections 48 located therein which are adapted to be received in cutout portions 49 of backing strip 28. In other words, because of the resilience of the material of which guard 43 is made, backing strip 28 can be inserted into slots 46 and projections 48 will yield to permit the end of the backing strip to enter the full length of slots 46 and will thereafter snap into recesses 49 in backing strip 28 to hold the guard 43 in position on the backing strip. Furthermore disc 44 has a cutout portion 50 into which the outer end of lever 23 fits. Centrally positioned partly within cutout 50 is a channel-like projection 51 having an internal surface 52 for receiving the end of enlarged top portion 40 (FIG. 4) of the blade 35. Located on the end wall of lower depending or anchoring portion 45 is a pin 53 which is adapted to be received in the apex of U-shaped portion 54 at the end of flexible backing strip 28, this fit enhancing the stability of the assembly. In view of the type of fits between the anchoring end 47 of backing strip 28 in slots 46 with the above-described type of locking engagement between slots 49 and projections 48, and in view of the fit of the outer end of lever 23 in recess 50, and in view of the fit of enlarged top portion 40 of the wiper blade in channel 52, and in view of the fit of pin 53 within U-shaped portion 54 of the end of the backing strip, guard 43 is held securely on the end of wiper 21 during operation and will not be dislodged in the event of contact with the other wiper or by careless manipulation thereof, as when the windshield is cleaned manually.

It can thus be seen that a simple arrangement has been provided which permits wipers which travel in opposed relationship to each other to provide overlapping wipe patterns without any possibility of damage due to their tendency to contact each other, as may occur in the event of faulty alignment of the wipers. Furthermore, because of the use of guard or fender 43, the wipers can be parked at an extremely low position on the molding of the windshield, thereby obviating a condition wherein one of the wipers has to be spaced a considerable distance from the bottom of the windshield to avoid entanglement of the wipers when they are placed in operation.

The wiper system is installed in the following manner. The wiper motor is placed in a parked condition and the wiper arms mounting the wipers are then installed on their respective rockshafts so that the lowermost wiper 21 is abutting the lower window molding and the outer end of wiper 22 rests against fender 43. Because of this arrangement the higher wiper 22 is spaced relatively close to the bottom of the windshield. When the wiper motor is started, wiper 22 will ride on fender 43 for a short distance, the fender 43 insuring that the ends of the wiper blades do not become interlocked with each other. However, as is well understood in the art, during actual wiper operation the wipers do not return to their extreme lowermost parked positions shown in FIG. 1, but reverse their movement at positions spaced above their parked positions, these points of reversal indicated by dotted lines in FIG. 1. Ordinarily wiper 22 will not contact fender 43 during actual operation as the wipers are oscillated back and forth notwithstanding that the wipe patterns overlap. However, in the event of misalignment between wipers 21 and 22, fender 43 will prevent them from interlocking in the zone where their wipe patterns overlap, that is, the zone adjacent to the point where they reverse their direction of travel.

While a preferred embodiment of the present invention has been disclosed, it will readily be understood that it is not limited thereto, but may be otherwise embodied within the scope of the following claims.

What is claimed is:

1. A fender adapted to be secured to the end of a windshield wiper for a curved windshield to prevent said wiper from becoming entangled with an adjacent wiper during opposed overlapping operation with said other wiper comprising recess means in said fender for receiving the end of the surface conforming structure of said wiper, an anchoring portion forming a part of said fender for receiving an anchoring portion of a backing strip of said wiper to thereby secure said fender on said wiper, said anchoring portion of said fender and said anchoring portion of said backing strip providing an interfitting engagement to preclude inadvertent separation, said recess means in said fender for receiving the surface conforming structure of said wiper permitting relative movement between said fender and said surface conforming structure in a direction longitudinally of said wiper while said wiper flexes to conform to various areas of a curved windshield, and a continuously curved laterally projecting camming surface on said fender adapted to preclude entangling engagement with said adjacent wiper in the event of physical contact therewith.

2. A windshield wiper for a curved surface comprising a wiping blade, a backing strip for mounting said wiping blade, a surface conforming superstructure for mounting said backing strip, and fender means mounted on the outboard end of said windshield wiper, said fender means including a connection for securely fastening said fender means to said backing strip and including a recess for receiving the outer end of said superstructure therein while permitting relative movement therebetween during surface conforming action of said wiper.

3. A fender adapted to be secured to the end of a windshield wiper for a curved windshield to prevent said wiper from becoming entangled with an adjacent wiper during opposed overlapping operation with said other wiper comprising recess means in said fender for receiving the end of the surface conforming structure of said wiper, an anchoring portion forming a part of said fender for receiving an anchoring portion of a backing strip of said wiper to thereby secure said fender on said wiper and a camming surface on said fender adapted to preclude entangling engagement with said adjacent wiper in the event of physical contact therewith, said anchoring portion of said fender and said anchoring portion of said backing strip providing an interfitting engagement to preclude inadvertent separation, said recess means in said fender for receiving the surface conforming structure of said wiper permitting relative movement between said fender and said surface conforming structure in a direction longitudinally of said wiper while said wiper flexes to conform to various areas of a curved windshield.

4. A fender adapted to be secured to the end of a windshield wiper for a curved windshield to prevent said wiper from becoming entangled with an adjacent wiper during opposed overlapping operation with said other wiper comprising means on said fender engageable with the end of the surface conforming structure of said wiper, an anchoring portion forming a part of said fender for receiving an anchoring portion of a backing strip of said wiper to thereby secure said fender on said wiper, said means on said fender engageable with the end of the surface conforming structure of said wiper permitting relative movement between said fender and said surface conforming structure in a direction longitudinally of said wiper while said wiper flexes to conform to various areas of a curved windshield.

5. A windshield wiper for a curved surface comprising a wiping blade, a backing strip for mounting said wiping blade, a surface conforming superstructure for mounting said backing strip, and fender means mounted on the outboard end of said windshield wiper, said fender means including a connection for securely fastening said fender means to said backing strip and including a recess for receiving the outer end of said superstructure therein while permitting relative movement therebetween during surface conforming action of said wiper, and a camming surface on said fender adapted to preclude entangling engagement with said adjacent wiper in the event of physical contact therewith.

References Cited in the file of this patent

UNITED STATES PATENTS

| | | |
|---|---|---|
| 2,728,100 | Oishei | Dec. 27, 1955 |
| 2,953,804 | Roberts et al. | Sept. 27, 1960 |

FOREIGN PATENTS

| | | |
|---|---|---|
| 832,466 | Great Britain | Apr. 13, 1960 |
| 1,162,314 | France | Apr. 8, 1958 |
| 1,197,483 | France | June 1, 1959 |